(12) United States Patent
Jang et al.

(10) Patent No.: US 7,751,110 B2
(45) Date of Patent: Jul. 6, 2010

(54) VERSATILE DISPLAY DEVICE

(75) Inventors: Ja Soon Jang, Gwangjoo-si (KR); Hyun Hwi Lee, Gwangjoo-si (KR); Sung Jin Son, Gwangjoo-si (KR)

(73) Assignee: LG Innotek Co., Ltd., Seoul (KR)

( * ) Notice: Subject to any disclaimer, the term of this patent is extended or adjusted under 35 U.S.C. 154(b) by 481 days.

(21) Appl. No.: 11/720,223

(22) PCT Filed: Jul. 6, 2005

(86) PCT No.: PCT/KR2005/002174

§ 371 (c)(1),
(2), (4) Date: May 25, 2007

(87) PCT Pub. No.: WO2007/004759

PCT Pub. Date: Jan. 11, 2007

(65) Prior Publication Data

US 2008/0018978 A1 Jan. 24, 2008

(51) Int. Cl.
*G02F 1/15* (2006.01)
*G02F 1/153* (2006.01)

(52) U.S. Cl. .................. 359/265; 359/267; 359/271

(58) Field of Classification Search .......... 359/265–275
See application file for complete search history.

(56) References Cited

U.S. PATENT DOCUMENTS 4,750,816 A * 6/1988 Ito et al. ................. 359/268

FOREIGN PATENT DOCUMENTS

| JP | 60181732 A | 9/1985 |
| JP | 09152634 A | 6/1997 |
| WO | WO03/048849 | 6/2003 |

* cited by examiner

*Primary Examiner*—Evelyn A. Lester
(74) *Attorney, Agent, or Firm*—Saliwanchik, Lloyd & Saliwanchik

(57) ABSTRACT

There is provided a versatile display device comprising: a first electrode layer formed on a transparent substrate; an electrochromic layer formed on the first electrode layer; a second electrode layer consisting of a plurality of first conductive line groups arranged in the first direction on the electrochromic layer; a light-emitting device layer formed on the second electrode layer and emitting light; and a third electrode layer formed on the light-emitting device layer and consisting of a plurality of second conductive line groups arranged in the second direction that is different from the first conductive line group.

20 Claims, 2 Drawing Sheets

[Fig. 1]
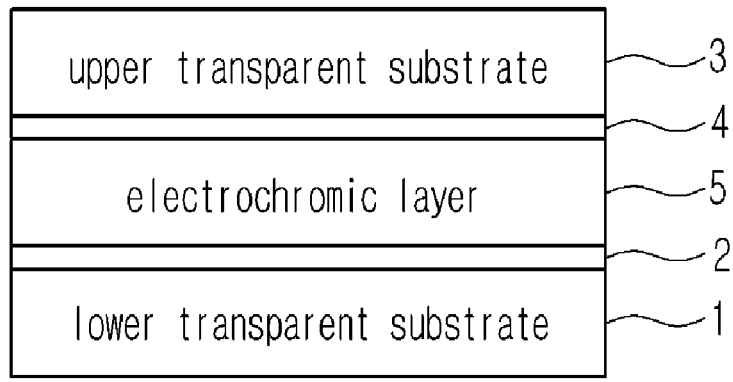
[Fig. 2]
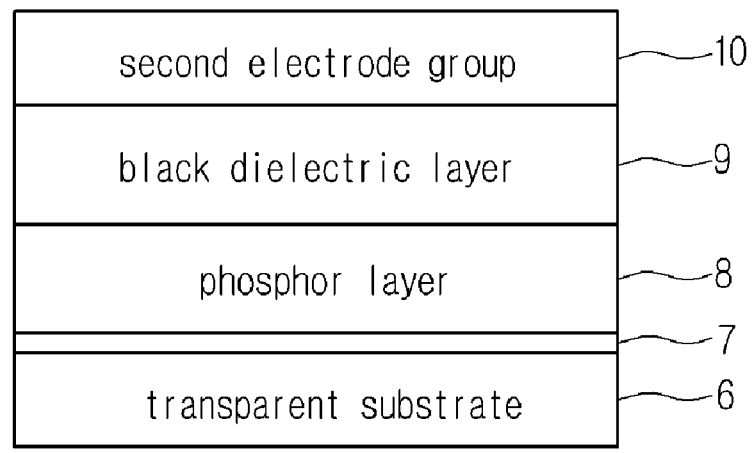
[Fig. 3]
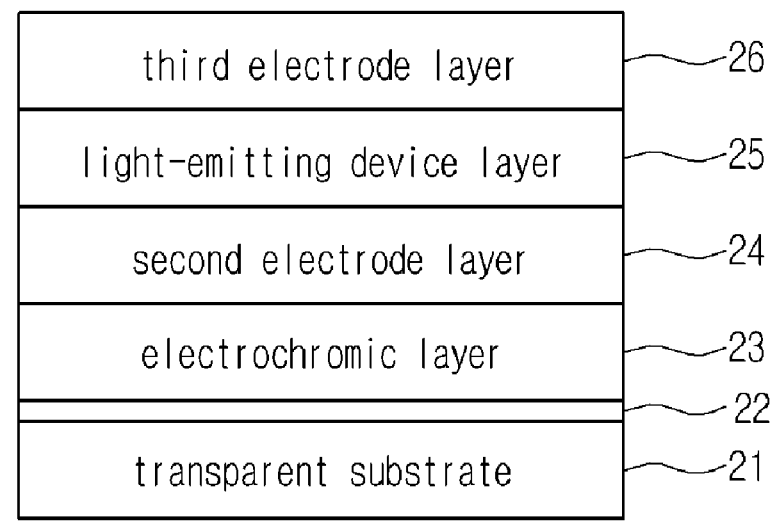

[Fig. 4]
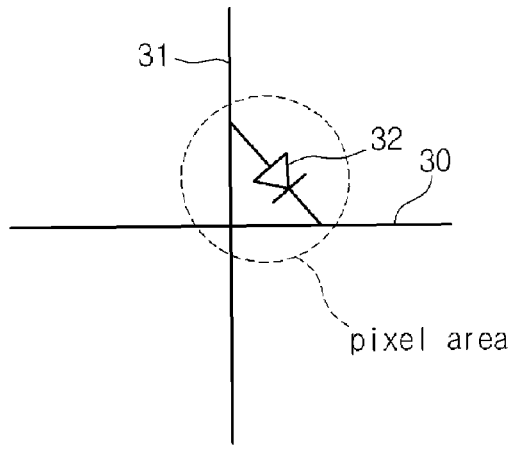
[Fig. 5]
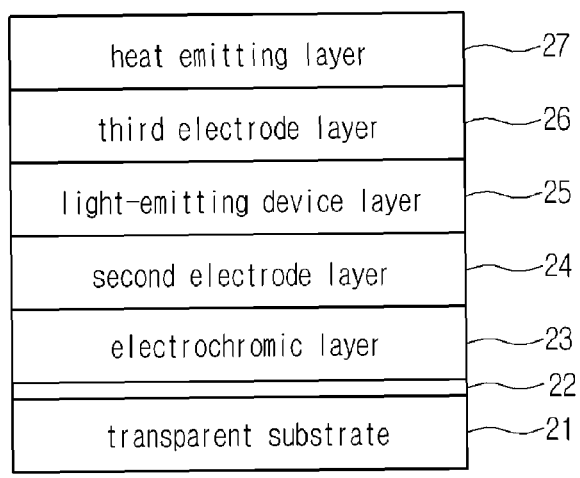
[Fig. 6]
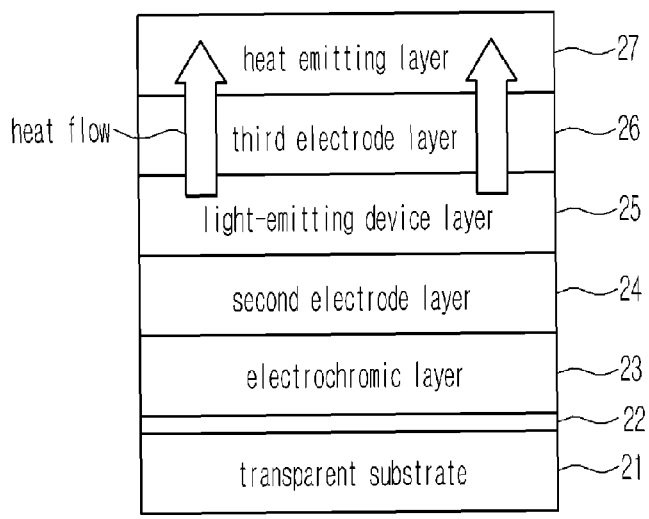

VERSATILE DISPLAY DEVICE

CROSS-REFERENCE TO RELATED APPLICATION

This application is the U.S. national stage application of International Patent Application No. PCT/KR2005/002174, filed Jul. 6, 2005, the disclosure of which is hereby incorporated by reference in its entirety.

TECHNICAL FIELD

The present invention relates to a versatile display device having a windows function and a display function.

BACKGROUND ART

Generally, an electrochromic device (ECD) displays or stores using electrochromism and is used in a smart window, a display device, and a micro-battery, etc.

Here, the electrochromism means a phenomenon that when a voltage is applied, an electrolytic oxidation or reduction reaction and colorizing/decolorizing is reversibly performed.

That is, the electrochromic device displays a new color or generates a transmission/non-transmission window as an absorption amount of light increases by an oxidation-reduction reaction or an electron transition which loses or obtains an electron when a voltage is applied to an electrochromic material that is a light transmitting body.

FIG. 1 is a view illustrating an embodiment of a related art general electrochromic device.

As shown in FIG. 1, the related art electrochromic device includes a structure having an electrochromic layer 5 formed between a lower transparent substrate 1 to which a lower conductive layer 2 is adhered and an upper transparent substrate 3 to which an upper conductive layer 4 is adhered. Here, the upper/lower conductive layer is made of an indium-tin-oxide (ITO) material having a transparent conductive material. The electrochromic layer 5 is colored/decolored by a voltage and may be made of a material having a transmission characteristic or non-transmission characteristic. At this time, if the electrochromic layer 5 is made of a material having a specific color, the specific color (for example, green color) can be embodied by a voltage. The lower conductive layer 2 and the upper conductive layer 4 can be formed on an entire surface of the lower transparent substrate 1 and the upper transparent substrate 3, respectively.

Therefore, the electrochromic layer 5 has a transmission characteristic by the voltage applied to the upper/lower conductive layers 2 and 4, so that visible light incident to the lower transparent substrate 1 can be emitted to the outside through the upper transparent substrate 3.

If a voltage opposite to the voltage applied before is applied, the electrochromic layer 5 has non-transmission characteristic, so that visible light incident to the lower transparent substrate 1 can be not emitted to the outside through the upper transparent substrate 3.

When the electrochromic device having such characteristics is applied to a vehicle window or a building window, etc., the outside can be seen or not through the window as needed.

Further, as described above, the electrochromic device can be used as a display device for displaying a specific color.

However, because the related art electrochromic device is required for a long time in colorizing/decolorizing, it is not proper for a display characteristic which should instantly display a color, so that it has been not in the spotlight.

On the other hand, a display device may have a structure shown in FIG. 2. The display device may be used as, for example, a display device of a car and display a number, a character, or an image.

FIG. 2 is a view illustrating an embodiment of a display device employing a related art general phosphor.

As shown in FIG. 2, the display device employing the related art phosphor includes a plurality of first electrode groups 7 arranged in the first direction on a transparent substrate 6, a phosphor layer 8 formed on the transparent substrate 6 in which the first electrode group 7 is arranged, a black dielectric layer 9 formed on the phosphor layer 8 to improve a contrast of the phosphor layer 8, and a plurality of second electrode groups 10 formed on the black dielectric layer 9 and arranged in the second direction perpendicular to the first electrode group 7.

Here, the first electrode group 7 is made of ITO having a transparent conductive material so that the color generated in the phosphor 8 may be transmitted and exposed to the outside through the transparent substrate 6. On the other hand, the second electrode group 10 may be made of a transparent or opaque conductive material because the color generated in the phosphor 8 is not transmitted by the black dielectric layer 9 and emitted to only the transparent substrate 6 side.

The phosphor layer 8 is made of a phosphorous material that converts electricity to light and the set color is generated by a predetermined voltage. For example, in a case where the phosphor layer 8 is made of a phosphorous material having red (R) color, when a voltage is applied to the phosphor layer 8, red (R) color can be generated. Therefore, as the phosphor layer 8 is made of a phosphorous material to embody a specific color, the specific color can be generated.

On the other hand, in a case of embodying diverse colors as needed, the phosphor layer 8 can be made of a phosphorous material having corresponding colors. For example, a surface of the phosphor layer 8 is composed of a plurality of pixels in which phosphorous materials having the respective red (R) color, green (G) color, and blue (B) color are arranged in a matrix shape, diverse colors are generated by the respective pixels having the respective color phosphorous materials by a voltage applied between a plurality of first electrode groups 7 vertically arranged and a plurality of second electrode groups 10 and a predetermined image can be displayed by the diverse colors.

As described above, the electrochromic device can control transmission/non-transmission and the display device using a phosphor can embody a predetermined image.

However, a display device having a transmission/non-transmission function, that is, a window function and a display function has been not yet suggested.

DISCLOSURE OF INVENTION

Technical Problem

The present invention provides a versatile display device simultaneously having a window function and a display function.

Technical Solution

The present invention provides a versatile display device comprising: a first electrode layer formed on a transparent substrate; an electrochromic layer formed on the first electrode layer; a second electrode layer consisting of a plurality of first conductive line groups arranged in the first direction on the electrochromic layer; a light-emitting device layer formed on the second electrode layer and emitting light; and a third electrode layer formed on the light-emitting device layer and consisting of a plurality of second conductive line groups arranged in the second direction that is different from the first conductive line group.

The present invention provides a versatile display device comprising: a first electrode layer formed on a transparent substrate; an electrochromic layer formed on the first electrode layer; a second electrode layer consisting of a plurality of first conductive line groups arranged in the first direction on the electrochromic layer; a light-emitting device layer formed on the second electrode layer and emitting light; a third electrode layer formed on the light-emitting device layer and consisting of a plurality of second conductive line groups arranged in the second direction that is different from the first conductive line group, and a heat emitting layer for emitting heat generated in the light emitting device layer.

Advantageous Effects

According to a versatile display device of the present invention, it is possible to simultaneously embody a windows function and a display function. For example, if the versatile display device is applied to a glass window, the outside can be seen or not by controlling the device in a transmission/non-transmission mode at normal times and a clear image embodied in various colors can be seen through a display function as needed.

Therefore, the versatile display device can be vigorously applied in various applied fields, for example, a car, an airplane, glasses, and a building window.

BRIEF DESCRIPTION OF THE DRAWINGS

FIG. 1 is a view illustrating an embodiment of a related art general electrochromic device.

FIG. 2 is a view illustrating an embodiment of a display device employing a related art general phosphor.

FIG. 3 is a view schematically illustrating an embodiment of a versatile display device according to the present invention.

FIG. 4 is a view illustrating a state that a light-emitting diode is arranged in the versatile display device shown in FIG. 3.

FIG. 5 is a view schematically illustrating another embodiment of a versatile display device according to the present invention.

FIG. 6 is a view illustrating a state that heat generated in a light-emitting device layer of the versatile display device shown in FIG. 5 is emitted.

MODE FOR THE INVENTION

The present invention will now be described more fully with reference to the accompanying drawings, in which exemplary embodiments of the invention are shown.

FIG. 3 is a view schematically illustrating an embodiment of a versatile display device according to the present invention.

As shown in to FIG. 3, the versatile display device according to the present invention includes a transparent substrate 21 made of a transparent material, a first electrode layer 22 formed on an entire surface of the transparent substrate 21, an electrochromic layer 23 formed on the first electrode layer 22, a second electrode layer 24 consisting of a plurality of first conductive line groups arranged in the first direction on the electrochromic layer 23, a light-emitting device layer 25 formed and emitting light on the second electrode layer 24, and a third electrode layer 26 formed on the light-emitting device layer 25 and consisting of a plurality of second conductive line groups arranged in the second direction perpendicular to the first conductive line group.

The transparent substrate 21 is made of a transparent material having excellent light transmittance.

The first electrode layer 22 is made of a transparent conductive oxide (TCO) material having excellent light transmittance and formed in one body on an entire surface of the transparent substrate 21.

The electrochromic layer 23 is colored/decolored by a voltage applied from the outside and made of light transmitting or non-transmitting material.

The second electrode layer 24 includes a plurality of first conductive line groups arranged in the first direction (for example, the width direction) and is made of a TCO material. The second electrode layer 24 can be used as a common electrode for controlling the electrochromic layer 23 and the light-emitting device layer 25. That is, in order to control the electrochromic layer 23, a predetermined voltage can be applied between the first electrode layer 22 and the second electrode layer 24. Further, in order to control the light-emitting device layer 25, another voltage can be applied between the second electrode layer 24 and the third electrode layer 26. As the second electrode layer 24 is used as a common electrode, the number of the electrode layers can be reduced, so that it is possible to obtain the effect of cost saving.

It is preferable that the light-emitting device layer is composed of a plurality of pixel areas arranged in a matrix shape.

In order to separate the pixel areas from each other, black matrixes made of an oxidation material or a metal material having low light transmittance may be provided between each pixel area. These black matrixes can prevent color generated in a corresponding pixel area from being leaked to surrounding pixel areas.

It is preferable that the black matrix has an electro-static discharge (ESD) prevention function. That is, the electro-static discharge is generally easy to generate in a display device having a small pixel area. Therefore, by adding a function of preventing the electro-static discharge to the black matrix, it is possible to prevent a breakdown or an operation characteristic decline due to the electro-static discharge.

As shown in FIG. 4, a light-emitting diode can be provided in each pixel area.

Here, the pixel area can be defined by the intersection of a first electrode line group and a second electrode line group.

A light-emitting diode 32 is provided between an electrode line 30 included in the second electrode layer 24 and an electrode line 31 included in the third electrode layer 26. At this time, it is preferable that a P layer of the light-emitting diode 32 is connected to the electrode line 30 of the second electrode layer 24 and an N layer thereof is connected to the electrode line 31 of the third electrode layer 26. Therefore, in order to emit the light-emitting diode 32, (+) voltage should be applied to the electrode line 30 of the second electrode layer 24 and (−) voltage should be applied to the electrode line 31 of the third electrode layer 26. The light-emitting diode is generally composed of a P layer, an N layer, and an active layer, etc. At this time, the light-emitting diode emits light by coupling of an electron and a hole due to a voltage applied between the P layer and the N layer.

The light-emitting diode has a chip shape and is connected to the electrode lines 30 and 31 by wire bonding.

Otherwise, the light-emitting diode can be grown on the second electrode layer 24 or the third electrode layer 26 by a semiconductor process. At this time, it is preferable that the light-emitting diode is grown on a transparent nitride or oxide substrate.

It is preferable that the light-emitting device layer is made of a combination of a red color light-emitting diode, a green color light-emitting diode, and a blue color light-emitting diode. Therefore, by controlling to emit light from each light-emitting diode, it is possible to embody full color at the light-emitting device layer.

The third electrode layer 26 includes a plurality of second conductive line groups arranged in the second direction (for example, the length direction) perpendicular to the first conductive line group and may be made of any conductive material. That is, it is unnecessary that the third electrode layer 26 is made of a TCO material because light does not emit to the third electrode layer 26. In other words, the third electrode layer 26 may be made of a TCO material or an opaque material. However, it is preferable that the third electrode layer 26 is made of a conductive material in which a current flows well when a voltage is applied.

In a versatile display device according to the present invention having the above construction, the electrochromic layer 23 is controlled by a voltage applied to the first electrode layer 22 and the second electrode layer 24 and has transmission characteristic/non-transmission characteristic.

Therefore, the electrochromic layer 23 can have a windows function due to the transmission characteristic/non-transmission characteristic.

At this time, the same voltage should be applied to all of a plurality of first conductive line groups included in the second electrode layer 24. If there is a conductive line group to which a voltage is not applied among a plurality of conductive line groups, a predetermined voltage is not applied to the electrochromic layer 23 positioned in a area corresponding to the conductive line group, so that the electrochromic layer 23 may not properly show transmission characteristic/non-transmission characteristic.

Further, because a plurality of light-emitting diodes included in the light-emitting device layer 25 are controlled by a voltage applied to the second electrode layer 24 and the third electrode layer 26, the wanted number, character, or image can be displayed.

For example, blue color light can be emitted by a voltage applied between a electrode line included in the second electrode layer 24 connected to a blue color light-emitting diode and a electrode line included in the third electrode layer 26.

Colored light thus emitted is recognized by a human's naked eye through the second electrode layer 24, the electrochromic layer 23, the first electrode layer 22, and the transparent substrate 21. At this time, the electrochromic layer 23 is adjusted to have the transmission characteristic by a predetermined voltage.

FIG. 5 is a view schematically illustrating another embodiment of a versatile display device according to the present invention, where the versatile display device is useful when an operational characteristic is deteriorated because a substantial amount of heat is generated as several tens of light-emitting diodes are provided in the versatile display device.

As shown in FIG. 5, the versatile display device according to the present invention includes a transparent substrate 21 made of a transparent material, a first electrode layer 22 formed on an entire surface of the transparent substrate 21, an electrochromic layer 23 formed on the first electrode layer 22, a second electrode layer 24 consisting of a plurality of first conductive line groups arranged in the first direction on the electrochromic layer 23, a light-emitting device layer 25 formed and emitting light on the second electrode layer 24, a third electrode layer 26 formed on the light-emitting device layer 25 and consisting of a plurality of second conductive line groups arranged in the second direction perpendicular to the first conductive line group, and a heat emitting layer 27 for emitting heat generated in the light-emitting device layer 25.

FIG. 5 is similar with FIG. 3, but in FIG. 5, a heat emitting layer 27 for emitting more quickly the heat generated in the light-emitting device layer 25 to the outside is further provided.

Hereinafter, elements substantially equal to those described in FIG. 3 are already described in detail and thus descriptions thereof will be omitted.

The heat emitting layer 27 is provided to emit more quickly heat generated in the light-emitting device layer 25 to the outside and may be made of a TCO material having high thermal conductivity. At this time, in order to emit heat more quickly, it is advantageous that the heat emitting layer 27 has a large sectional area, so that the heat emitting layer 27 is formed as thickly as possible. Further, it is preferable that the heat emitting layer 27 has at least two times higher thermal conductivity than the first and second electrode layers 22 and 24.

Because the heat emitting layer 27 having high thermal conductivity and thickly formed is provided on the third electrode layer 26, heat generated in the light-emitting device layer 25 emits to the heat emitting layer 27 via the third electrode layer 26 instead of emitting to the electrochromic layer 23, thereby emitting more quickly to the outside.

As shown in FIG. 6, the heat generated in the light-emitting device layer 25 is mainly emitted to the outside through the heat emitting layer 27.

In a versatile display device according to the present invention having the above construction, the electrochromic layer 23 is controlled by a voltage applied to the first electrode layer 22 and the second electrode layer 24 and has transmission characteristic/non-transmission characteristic.

At this time, the same voltage should be applied to all of a plurality of first conductive line groups included in the second electrode layer 24. If there is a conductive line group to which a voltage is not applied among a plurality of conductive line groups, a predetermined voltage is not applied to the electrochromic layer 23 positioned in a area corresponding to the conductive line group, so that the electrochromic layer 23 may not properly show transmission characteristic/non-transmission characteristic.

Further, because a plurality of light-emitting diodes included in the light-emitting device layer 25 are controlled by a voltage applied to the second electrode layer 24 and the third electrode layer 26, the wanted number, character, or image can be displayed.

Colored light thus emitted is recognized by a human's naked eye through the second electrode layer 24, the electrochromic layer 23, the first electrode layer 22, and the transparent substrate 21. At this time, the electrochromic layer 23 is adjusted to have the transmission characteristic by a predetermined voltage.

INDUSTRIAL APPLICABILITY

According to a versatile display device of the present invention, it is possible to simultaneously embody a windows function and a display function. For example, if the versatile display device is applied to a glass window, the outside can be seen or not by controlling the device in a transmission/non-transmission mode at normal times and a clear image embodied in various colors can be seen through a display function as needed.

Therefore, the versatile display device can be vigorously applied in various applied fields, for example, a car, an airplane, glasses, and a building window.

The invention claimed is:

1. A versatile display device comprising:
   a first electrode layer formed on a transparent substrate;
   an electrochromic layer formed on the first electrode layer;
   a second electrode layer on the electrochromic layer, the second electrode layer comprising a plurality of first conductive line groups arranged in the first direction;
   a light-emitting device layer formed on the second electrode layer; and
   a third electrode layer formed on the light-emitting device layer and comprising a plurality of second conductive line groups arranged in the second direction that is different from the first conductive line group.

2. The versatile display device of claim 1, wherein the first electrode layer is formed on an entire surface of the transparent substrate.

3. The versatile display device of claim 1, wherein the first electrode layer and the second electrode layer are made of a TCO (transparent conductive oxide) material.

4. The versatile display device of claim 1, wherein a pixel area is defined by the intersection of the first conductive line group and the second conductive line group.

5. The versatile display device of claim 4, wherein a light-emitting diode is provided in each pixel area of the light emitting device layer.

6. The versatile display device of claim 5, wherein the light-emitting diode emits light by a coupling of an electron and a hole.

7. The versatile display device of claim 5, wherein the light-emitting diode has a chip shape and is connected by wire bonding to the first conductive line group and the second conductive line group.

8. The versatile display device of claim 5, wherein the light-emitting diode is grown by a semiconductor process in the second electrode layer or the third electrode layer.

9. The versatile display device of claim 1, wherein a black matrix is provided between pixel areas in the light emitting device layer.

10. The versatile display device of claim 9, wherein the black matrix is made of a metal material or an oxidation material.

11. The versatile display device of claim 9, wherein the black matrix has an electro-static discharge prevention function.

12. The versatile display device of claim 1, wherein the light-emitting device layer comprises a red color light-emitting diode, a green color light-emitting diode, and a blue color light-emitting diode.

13. The versatile display device of claim 1, wherein the second electrode layer is used as a common electrode for controlling the electrochromic layer and the light emitting device layer.

14. The versatile display device of claim 1, further comprising a heat emitting layer formed on the third electrode layer for emitting heat generated in the light emitting device layer.

15. A versatile display device comprising:
    a first electrode layer formed on a transparent substrate;
    an electrochromic layer formed on the first electrode layer;
    a second electrode layer on the electrochromic layer;
    a light-emitting device layer formed on the second electrode layer;
    a third electrode layer formed on the light-emitting device layer; and
    a heat emitting layer formed on the third electrode layer for emitting heat generated in the light emitting device layer.

16. The versatile display device of claim 15, wherein the heat emitting layer has at least two times higher thermal conductivity than the first electrode layer and the second electrode layer.

17. The versatile display device of claim 15, wherein the heat emitting layer is more thickly formed than the second electrode layer to improve heat emitting.

18. The versatile display device of claim 15, wherein the heat emitting layer is made of a TCO material.

19. The versatile display device of claim 15, wherein a light-emitting diode is provided in each pixel area of the light emitting device layer.

20. The versatile display device of claim 19, wherein the light-emitting diode is grown by a semiconductor process in the second electrode layer or the third electrode layer.

* * * * *